(12) United States Patent
Takeda et al.

(10) Patent No.: US 6,674,483 B2
(45) Date of Patent: Jan. 6, 2004

(54) INTERNET-CONNECTED TELEVISION RECEIVER DISPLAYS TIMED MESSAGES

(75) Inventors: Kasumi Takeda, Tokyo (JP); Ayumi Mizobuchi, Tokyo (JP); Mami Uchida, Saitama (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 09/769,627

(22) Filed: Jan. 25, 2001

(65) Prior Publication Data

US 2001/0020982 A1 Sep. 13, 2001

(30) Foreign Application Priority Data

Jan. 26, 2000 (JP) ...................................... P2000-021809

(51) Int. Cl.[7] ................................................ H04N 5/44
(52) U.S. Cl. .............. 348/553; 379/100.08; 379/102.03
(58) Field of Search ................................. 348/553, 552, 348/730; 379/88.25, 88.13, 88.15, 93.01, 100.08, 102.03; 455/412–414

(56) References Cited

U.S. PATENT DOCUMENTS

| | | | | |
|---|---|---|---|---|
| 5,262,860 A | * | 11/1993 | Fitzpatrick et al. | 358/142 |
| 5,548,635 A | * | 8/1996 | Bradley et al. | 379/102 |
| 5,570,295 A | * | 10/1996 | Isenberg et al. | 364/514 R |
| 5,633,918 A | * | 5/1997 | Mankovitz | 379/97 |
| 5,794,118 A | * | 8/1998 | Yoshinobu | 455/5.1 |
| 6,169,541 B1 | * | 1/2001 | Smith | 345/327 |
| 6,457,177 B1 | * | 9/2002 | Reams | 725/106 |

* cited by examiner

Primary Examiner—Victor R. Kostak
(74) Attorney, Agent, or Firm—Jay H. Maioli

(57) ABSTRACT

A television receiving apparatus capable of notifying a user away from home of a message stored in the apparatus includes a memory for storing various data, a clock circuit for counting a current time, a modem for establishing connection with a public switched network, and a control circuit. When the clock circuit reaches a time stored previously in the memory, the control circuit causes a message held in the memory to be transmitted via the modem to an address designated by data stored in the memory.

3 Claims, 5 Drawing Sheets

↓ STORAGE MODE

DISPLAY MODE

INTERNET-CONNECTED TELEVISION RECEIVER DISPLAYS TIMED MESSAGES

BACKGROUND OF THE INVENTION

The present invention relates to a television receiving apparatus.

It is conceivable for television sets to store various memos and messages so that the stored memos and messages may later be displayed on a TV screen when necessary. Such arrangements when implemented make it possible for a member of a family, upon coming home and finding himself or herself alone, to turn on the TV set to read memos or messages from other family members displayed on the screen.

A timer function added to that type of TV set serves as a personal schedule book. Illustratively, a user may store a memo "Call Mr. A" in correspondence with a specific time of day. When that time is reached, the memo "Call Mr. A" appears on the TV screen reminding the user to make the call.

The above type of TV set is thus supposed to be used conveniently as an apparatus for handling information.

Meanwhile, in the description that follows, memos and messages may be referred to generically as messages.

In utilizing the above-described schedule book function, the user may be away from home at a time when a message is due to appear on the TV screen. With such messages as a reminder out of sight, the user may not be able to keep his or her scheduled engagements.

SUMMARY OF THE INVENTION

It is therefore an object of the present invention to provide an improved television receiving apparatus that overcomes the above and other deficiencies of the prior art.

In carrying out the invention and according to one aspect thereof, there is provided a television receiving apparatus comprising: a memory for storing various data; a clock circuit for counting a current time; a modem for establishing connection with a public switched network; and a control circuit which, when the clock circuit reaches a time stored in the memory, causes a message held in the memory to be transmitted via the modem to an address designated by data stored in the memory. When the time to display the message is reached, the inventive television receiving apparatus transmits the message to the designated address.

As described and according to the invention, a message is stored into the television receiving apparatus in correspondence with a specific time of day. When the preset time is reached, the recorded message is displayed on the display of the apparatus.

If the user is away from home and unable to view at a preset time the message held by the television receiving apparatus, the message is forwarded to the equipment established previously for the purpose. By operating the equipment appropriately, the user can see the transferred message as a reminder and keep his or her scheduled engagements. Even if the television receiving apparatus is being turned off, the apparatus is turned on at the preset time so that the previously recorded message may be displayed.

DETAILED DESCRIPTION OF THE PREFERRED EMBODIMENTS

Figure 1:
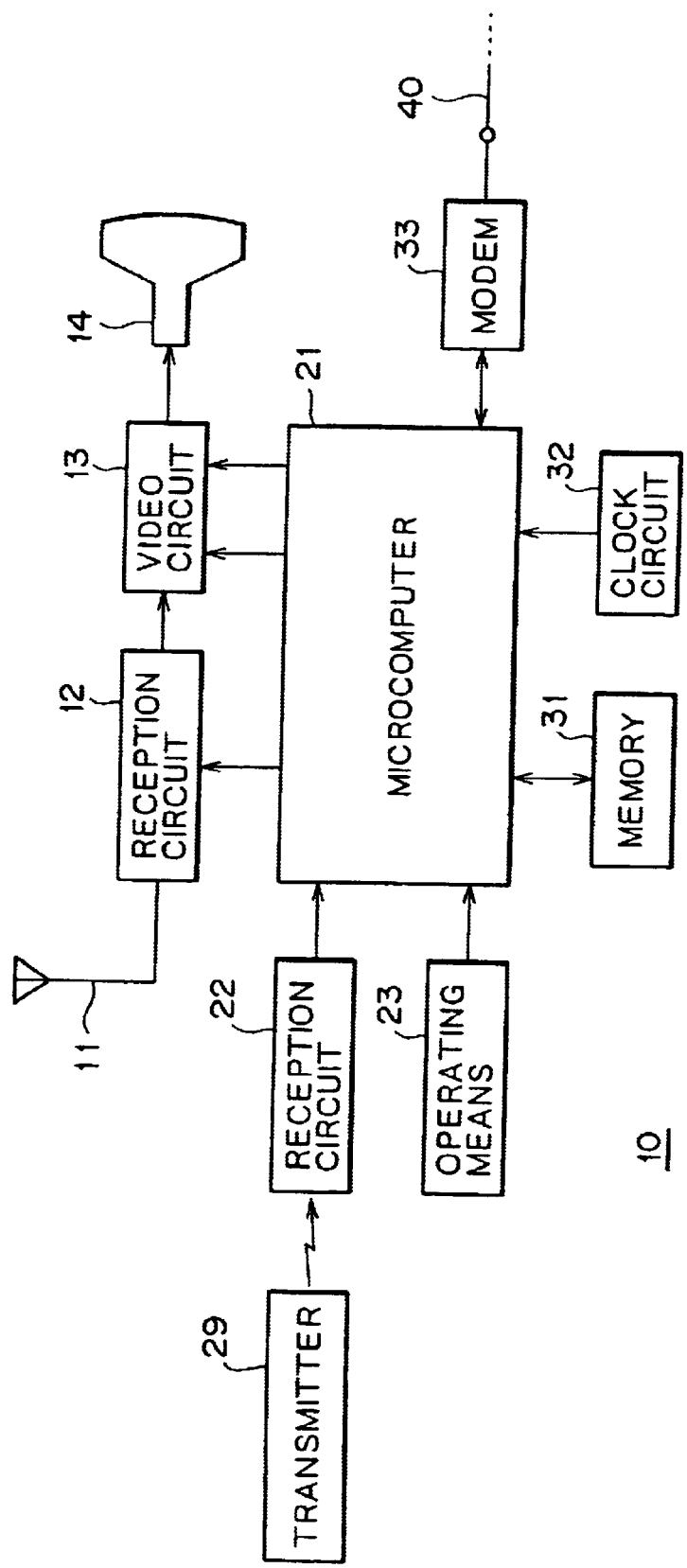
FIG. 1 is a schematic flow diagram representing a preferred embodiment of this invention.

In FIG. 1, reference numeral 10 denotes a television receiving apparatus embodying the invention. TV broadcast radio waves are received by an antenna 11. Received signals are forwarded form the antenna 11 to a reception circuit 12. Given the signals, the reception circuit 12 selects a desired channel and acquires color video signals of the selected channel through demodulation. The color video signals are fed to a video circuit 13. In turn, the video circuit 13 obtains through demodulation color video signals for display. The video signals are supplied to a display unit such as a color CRT 14 which displays images of the selected channel.

The television receiving apparatus 10 includes a microcomputer 21 for system control purposes. Although not shown, the microcomputer 21 has a CPU that executes programs, a ROM that stores various programs, a work area RAM, and ports connected to peripheral circuits and devices.

Figure 2:
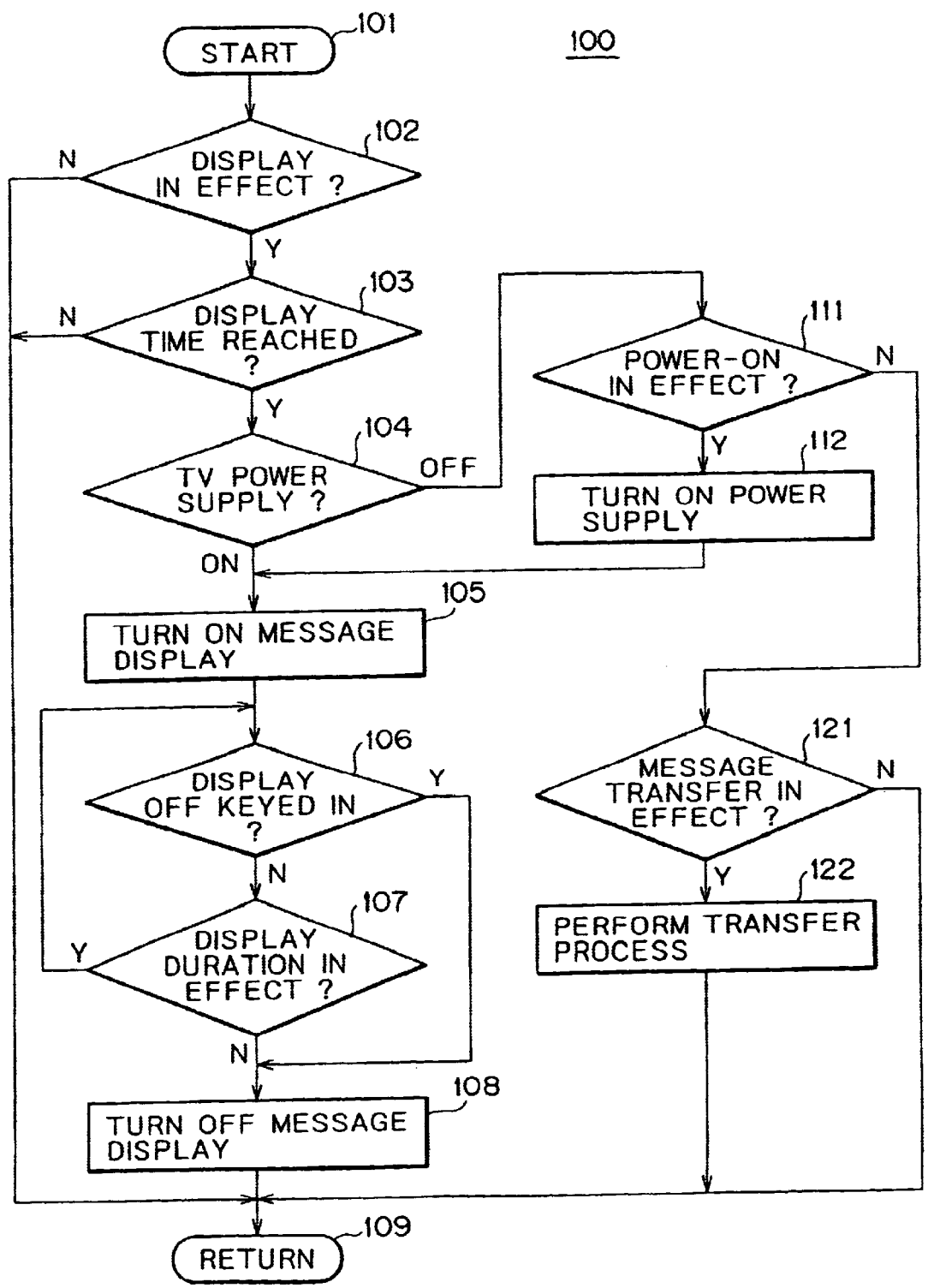
FIG. 2 is a flowchart of steps in which the embodiment operates.

The ROM in the microcomputer 21 comprises a message display and notification routine 100 depicted in steps in FIG. 2. The routine 100, to be described later in more detail, notifies the user of messages according to an internally stored schedule. The routine 100 is carried out by the CPU illustratively at intervals of one minute.

The steps in FIG. 2 are only the excerpts from the routine 100 which are related to this invention. Although not shown, the ROM of the microcomputer 21 also includes a routine for storing messages and related schedules.

As depicted in FIG. 1, various control signals are sent from the microcomputer 21 to the reception circuit 12 and video circuit 13. The microcomputer 21 supplies the video circuit 13 with video signals that are needed to store and display messages and schedules, as will be described later in more detail.

Furthermore, the microcomputer 21 is connected to a reception circuit 22 for receiving infrared signals from a remote controller, as well as to input operating means 23 such as a keyboard and a pointing device for changing channels and for storing messages and schedules. The reception circuit 22 for use with the remote controller is matched with a remote control transmitter 29 that outputs infrared signals.

The microcomputer 21 is also connected to a nonvolatile memory such as a flash memory 31 for storing message and schedule data, as well as to a clock circuit 32 for counting the current time. In addition, the microcomputer 21 is connected to a modem 33 which establishes connection with a public switched network (i.e., telephone line) 40.

Figure 3:
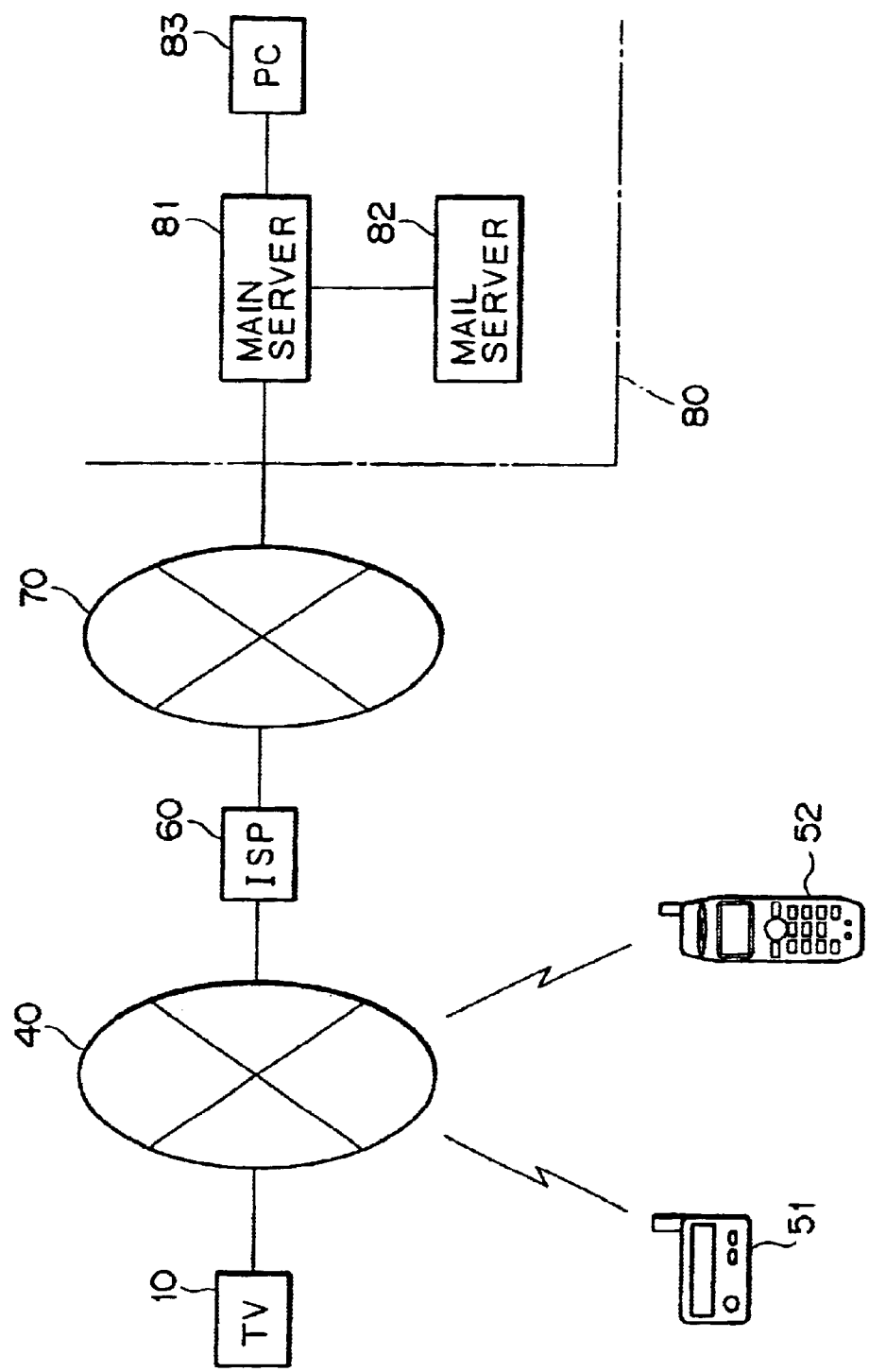
FIG. 3 is a schematic view of a typical network system for explaining this invention.

FIG. 3 is a schematic view of a typical network system that may be used in implementing the invention. In this system, a message stored in the television receiving apparatus 10 is transferred to a pager 51, to a mobile telephone 52, or to a personal computer 83 located in a corporate office 80. The message transfer to the personal computer 83 involves access to the Internet 70.

As outlined above, the television receiving apparatus 10 is connected via the modem 33 to the public switched network 40. An ISP 60 is connected to both the public switched network 40 and the Internet 70.

The corporate office 80 has a main server 81 and a mail server 82. The main server 81 is connected to the Internet 70. The personal computer 83 is connected to the main server 81.

In the above-described configuration, the following processes are carried out:

Entering of Messages and Schedules

Figure 4A:
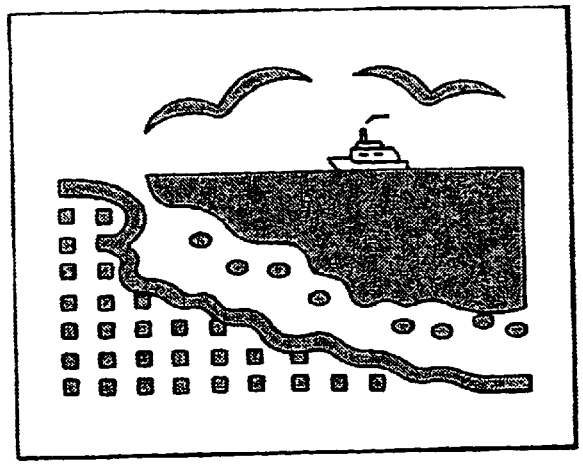
FIGS. 4A, 4B and 4C are schematic views of typical display screens.
Figure 4B:
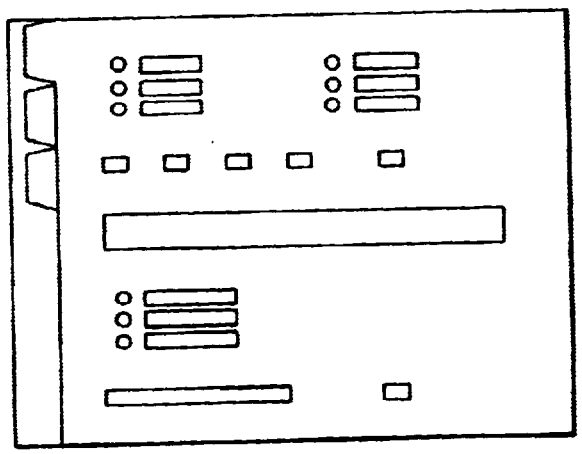
Figure 4C:
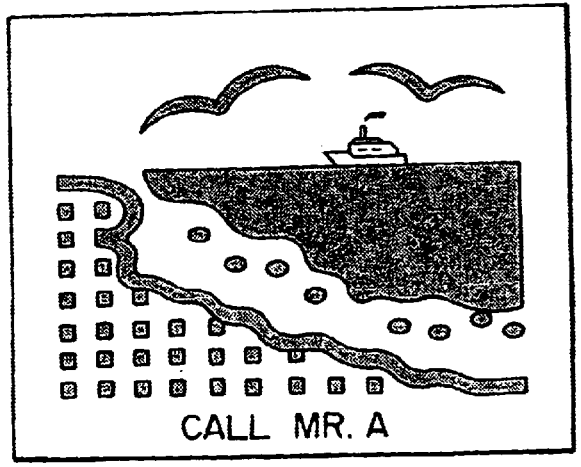

Messages and schedules are entered illustratively as shown in FIGS. 4A through 4C. For example, the user may suitably operate the input operating means 23 or the remote control transmitter 29 while watching a television program on the television receiving apparatus 10 as shown in FIG. 4A. The user's operation causes the television receiving apparatus 10 to enter a message and schedule storage mode. The CRT 14 displays a message and schedule storage screen as shown in FIG. 4B.

Figure 5:
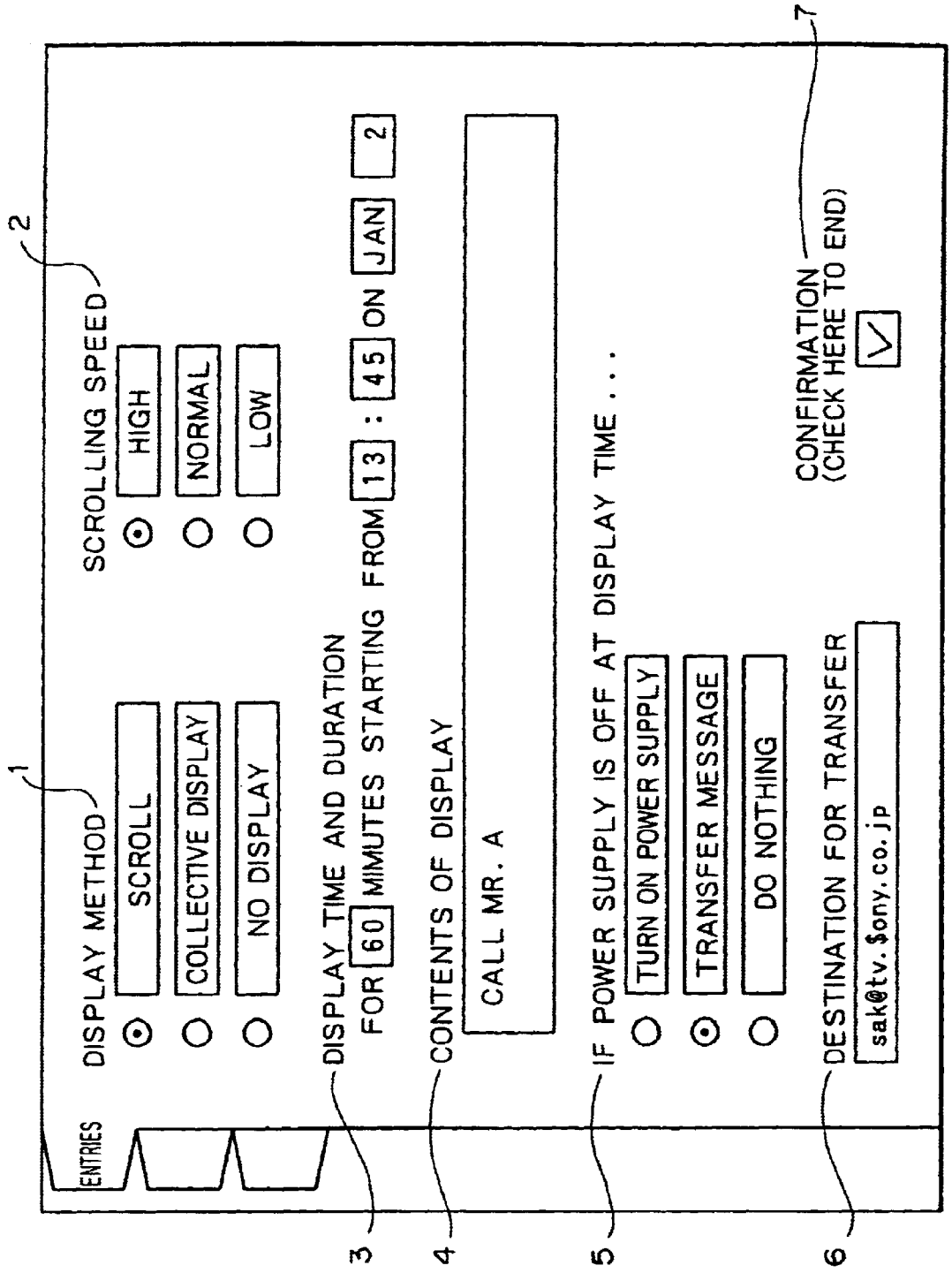
FIG. 5 is another schematic view of a typical display screen.

The storage screen is illustratively made up of items and related contents shown in FIG. 5. The parenthesized numerals 1 through 7 employed hereunder correspond to the numerals 1 through 7 in FIG. 5. These numerals represent the following items and contents:

Item 1: Method for displaying a stored message on the television receiving apparatus 10
One of "scroll display," "collective display" and "no display" is selected.
Item 2: Scrolling speed in effect when scroll display is selected
One of "high," "normal" and "low" is selected.
Item 3: Display starting time and display duration
Desired numbers are entered, such as "for 60 minutes starting from 13:45 on January 2."
Item 4: Contents of message to be displayed Characters such as "Call Mr. A" are input.
Item 5: Type of processing to be performed when a display starting time is reached while the television receiving apparatus 10 is being turned off
One of "turn on power supply," "transfer message" and "do nothing" is selected.
Item 6: Destination address in effect when "transfer message" is selected under the item 5 above
One of two address types is selected:
 1. If the destination of message transfer is a personal computer connected to the Internet or is similar equipment capable of receiving electronic mail, then an electronic mail address is entered illustratively as:
  sak@tv.$ony.co.jp
 2. If the destination is a pager or like portable equipment capable of displaying a message but incapable of receiving electronic mail, then the telephone number of the portable equipment to which messages are to be transmitted is entered illustratively as:
  003-1234-567* (not shown in FIG. 5)
Item 7: Confirmation
The choices and entries made under the items 1 through 6 are confirmed by checking this item.

By operating the input operating means 23 or remote control transmitter 29, the user chooses one of the alternatives under each of the applicable items above or enters specific numerals or characters into fields of the relevant items. If the alternative "no display" is illustratively selected under the item 1, there is no more need to make entries under the items 2 through 6. In that and other cases where entries are not necessary, the related items are not displayed on the screen.

After making all entries and checking the item 7 for confirmation, the user completes the message and schedule storing operation. Of the data entered under the items 1 through 6, those judged to be valid are stored into the memory 31. The television receiving apparatus 10 then returns to its normal mode and restores a normal TV screen display such as is shown in FIG. 4A.

Display and Notification of Messages

The display and the notification of messages are implemented by the microcomputer 21 carrying out the display and notification routine 100 as described below. When data are retained in the memory 31 in the storage mode above, it is assumed that the retained contents are data corresponding to the items 1 through 6. It is also assumed that the address entered under the item 6 is either the telephone number of the pager 51 or mobile telephone 52, or the mail address of the user utilizing the personal computer 83.

The processing of the routine 100 starts in step 101. In step 102, a check is made on the data under the item 1 from among the data in the memory 31, to see if either "scroll display" or "collective display" is set. If neither alternative is judged selected, step 102 is followed by step 109 in which the routine 100 is terminated.

If in step 102 either of the two display alternatives is judged to be set, step 102 is followed by step 103. In step S103, the data under the item 3 among the data in the memory 31 are compared with the current time counted by the clock circuit 32. A check is thus made to see if a message display starting time is reached. If the starting time has yet to be reached, step 103 is followed by step 109 in which the routine 100 is terminated.

The message display is not carried out if none of the message display alternatives is selected, or when the message display starting time has yet to be reached even if a message display alternative has been set.

If in step 103 the message display starting time is judged to be reached, step 103 is followed by step 104.
In step 104, a check is made to see whether a television program is ready to be watched with the reception circuit 12 and video signal 13 turned on, i.e., whether the television receiving apparatus is being activated.

If the television receiving apparatus is judged to be activated, step 104 is followed by step 105. In step 105, the video circuit 13 is set to enter a message display mode. Of the data held in the memory 31, the data under the item 4 are retrieved therefrom and fed to the video circuit 13. This causes the screen of the CRT 14 to start displaying a message constituted by the data under the item 4 such as "Call Mr. A" as shown in FIG. 4C.

In that case, the message is displayed either in a scrolling or in a collective manner according to the setting under the item 1 among the data in the memory 31. Where the "scroll display" alternative is in effect, scrolling is carried out at the scrolling speed designated by the data under the item 2.

Once the message display is started, step 106 is reached. In step 106, a check is made to see if the input operating means 23 or remote control transmitter 29 is suitably operated to end the message display. If no such operation is judged to be carried out, step 106 is followed by step 107. In step 107, a check is made to see if the display duration specified by the data under the item 3 among the data in the memory 31 has elapsed. If the display duration is still in effect, control is returned from step 107 to step 106.

That is, once the message display is started, it continues until an operation is performed to end it or until the display duration designated by the data under the item 3 has expired.

When the input operating means 23 or remote control transmitter 29 is operated to end the message display, the operation is recognized in step 106 and then step 106 is followed by step 108. Alternatively, when the display duration specified by the data under the item 3 is judged to have elapsed, the end of the duration is recognized in step 107 and step 107 is replaced by step 108.

In step 108, the video circuit 13 is set to enter a normal TV screen display mode. That is, as shown in FIG. 4A, the screen of the CRT 14 starts displaying a TV program. Later in step 109, the routine 100 is terminated.

As described, when a preset display starting time is reached while the television receiving apparatus is being turned on, i.e., when a TV program is being watched, a previously recorded message appears on the screen. When the preset display duration has elapsed or when a predetermined operation is carried out before the end of the display duration, the message display is terminated and replaced by the normal display mode.

If in step 104 the television receiving apparatus is judged to be turned off, step 104 is followed by step 111. In step 111, a check is made to determine which of the alternatives in the item 5 is selected from among the data in the memory 31.

If the "turn on power supply" alternative is judged to be selected under the item 5, step 111 is followed by step 112. In step 112, the television receiving apparatus is turned on, i.e., the reception circuit 12 and video circuit 13 of the apparatus are turned on. From this point of time, a TV program is displayed on the CRT 14.

Step 112 is followed by step 105 and subsequent steps. Thereafter, once the preset display starting time is reached, the recorded message appears on the screen of the CRT 14 as in the case in which the television receiving apparatus is being activated. Upon elapse of the preset display duration or before the end of that duration, a suitable operation may be carried out by the user to terminate the message display and bring about the normal display mode.

If in step 111 an alternative other than the "turn on power supply" is judged to be selected under the item 5 among the data in the memory 31, then step 111 is followed by step 121. In step 121, a check is made to see if the "transfer message" alternative is set under the item 5 among the data in the memory 31. If the "transfer message" alternative is judged to be selected, step 121 is followed by step 122.

In step 122, the message constituted by the data in the item 4 among the data in the memory 31 is transferred to the address set in the item 6. That is, if the address under the item 6 is an electronic mail address, a dial-up connection is established with the ISP 60 so that the microcomputer 21 is connected to the ISP 60 via the modem 33 and over the public switched network 40. Then an electronic mail is prepared by adding the mail address of the item 6 to the message data under the item 4. The electronic mail is transmitted to the ISP 60.

The electronic mail is transmitted illustratively from the ISP 60 over the Internet 70 to the mail server 82 in the corporate office 80. By suitably operating the personal computer 83, the user can read the mail (i.e., message) forwarded by the television receiving apparatus 10.

If the address set under the item 6 is a telephone number of the transfer destination, then the party having that telephone number such as the pager 51 is called through the modem 33 and over the public switched network 40. When connection is established with the pager 51, the data constituting the message under the item 6 are converted by the modem 33 into DTMF signals and transmitted to the pager 51. The received message is displayed on a display screen of the pager 51 so that the user may be able to read the message forwarded by the television receiving apparatus 10.

When the message transmission has ended, step 109 is reached. The routine 100 is terminated in step 109.

If in step 121 the data set under the item 5 do not denote the "transfer message" alternative among the data in the memory 31, that means the data under the item 5 designate "do nothing." In that case, step 121 is followed by step 109 in which the routine 100 comes to an end without doing anything.

Conclusions

When the television receiving apparatus 10 in FIG. 1 and the routine 100 in FIG. 2 are in use, a message may be stored into the apparatus 10 in correspondence with a time of day. When the preset time is reached, the stored message is displayed on the television receiving apparatus 10.

If the user is away from home and unable to view the message reproduced by the television receiving apparatus 10 at the preset time, the message is transferred to the equipment established previously as a destination for the message transfer. By suitably operating the equipment, the user is then able to watch the forwarded message as a reminder and keep his or her scheduled engagements without fail.

Even if the television receiving apparatus 10 is being deactivated, the apparatus is turned on at the preset time so as to display the previously recorded message.

The major acronyms used in this specification stand for the terms listed below.

CPU: Central Processing unit
CRT: Cathode Ray Tube
DTMF: Dual Tone Multiple Frequency
ISP: Internet Service Provider
RAM: Random Access Memory
ROM: Read Only Memory While the preferred embodiments of the present invention has been described using specific terms, such description is for illustrative purpose only, and it is to be understood that change and variations may be made without departing from the spirit or scope of the following claims.

What is claimed is:

1. A television receiving apparatus comprising:

a memory for storing various data;

a clock circuit for counting a current time;

a modem for establishing connection with a public switched network; and a control circuit which, when said clock circuit reaches a time stored in said memory, causes a message held in said memory to be transmitted via said modem to an address designated by data stored in said memory, wherein, when said clock circuit reaches the time stored in said memory while a power supply is being turned on, said control circuit displays said message on a display unit;

wherein, when said clock circuit reaches the time stored in said memory while said power supply is being turned off, said control circuit determines whether said power supply is set to be turned on; and wherein, if said control circuit judges that said power supply is set to be turned on, said control circuit turns on said power supply and then displays said message on said display unit.

2. A television receiving apparatus according to claim 1, wherein, if said control circuit judges that said power supply is not set to be turned on, then said control circuit determines whether said message is set to be transferred;

wherein, if said control circuit judges that said message is set to be transferred, then said control circuit transfers said message.

3. A television receiving apparatus according to claims 1 or 2, wherein said address is either an address of electronic mail or a telephone number of a portable terminal capable of displaying a message.

* * * * *